United States Patent [19]
Ballard

[11] 3,970,772
[45] July 20, 1976

[54] METHOD AND APPARATUS FOR SEALING AN ELECTRICAL RECEPTACLE

[76] Inventor: Hyde W. Ballard, Barto, Pa. 19504

[22] Filed: Aug. 7, 1975

[21] Appl. No.: 602,565

[52] U.S. Cl. .................................. 174/53; 200/302
[51] Int. Cl.² ......................................... H02G 3/08
[58] Field of Search ............... 174/53; 220/3.2, 3.8, 220/88 R, 88 A; 200/297, 302; 339/116 R, 122 R, 122 F, 93 R, 93 C, 94 R, 94 A

[56] References Cited
UNITED STATES PATENTS
3,684,819   8/1972   Wilson .................................. 174/53

Primary Examiner—J. V. Truhe
Assistant Examiner—D. A. Tone
Attorney, Agent, or Firm—Paul & Paul

[57] ABSTRACT

A strip of insulating material is applied to an electrical receptacle installed in an electrical outlet box to prevent the passage of air through the outlet box. A backing sheet is adhesively applied to the insulating material to ease installation and insure a tight seal.

5 Claims, 3 Drawing Figures

METHOD AND APPARATUS FOR SEALING AN ELECTRICAL RECEPTACLE

BACKGROUND OF THE INVENTION

This invention relates to sealing means for electrical outlets or receptacles.

Electrical outlets employed in buildings, mobile homes, motor homes, and other dwellings are frequently comprised of two components. An electrical outlet box, usually made of metal, is rigidly attached to the structure of the dwelling. These outlet boxes are frequently recessed into the wall of the dwelling, in such a manner that the back of the outlet box protrudes into an open space in the construction. The outlet box thus forms a means of communicating between the insulated dwelling and the air space. While this application speaks in terms of outlet boxes, it should be appreciated that other electrical fixtures, such as recessed switches, recessed light fixtures, etc., fall within the scope of this invention.

An electrical receptacle connected to the wiring of the dwelling is installed within the outlet box. Typically, a faceplate on the assembly provides a finished appearance.

The electrical outlets described above are not airtight. Accordingly, air seeps through the electrical outlet installation into the dwelling. Various methods have been used in the past to prevent this undesirable flow of air into the building. For example, U.S. Patent No. 3,684,819 discloses a rubber sealing boot adapted to prevent the flow of air through an electrical outlet. This method, while effective, requires the fabrication of specific boots for this purpose, and requires that the boot be installed before the electrical wires are attached. Other methods and apparatus have been used, but most are relatively complicated or difficult to install, or expensive.

SUMMARY OF THE INVENTION

This invention comtemplates the use of an insulating strip between the electrical outlet box and the electrical receptacle assembly to prevent the passage of air through the assembled unit. A strip of insulation cut to the proper size, is wrapped around the electrical receptacle assembly after the wires have been attached to the electrical receptacle. The wrapped receptacle is then inserted into the electrical outlet box in such a manner that the insulation spreads out and fills the unoccupied volume of the outlet box. The insulation strip may have an adhesively applied backing strip to facilitate easy assembly. The insulation strip is preferably made of glass fiber, since this material resists rot, does not absorb water, is nonflammable, provides good electrical and thermal insulation, and is readily compressed, though resilient.

Accordingly, it is a primary object of this invention to provide an economical, easily assembled, seal for electrical outlet boxes which can be easily installed in new or older electrical outlet assemblies.

Still other objects will readily present themselves to one skilled in the art upon reference to the ensuing specification, the drawings, and the claims.

DESCRIPTION OF THE PREFERRED EMBODIMENT

Figure 1:
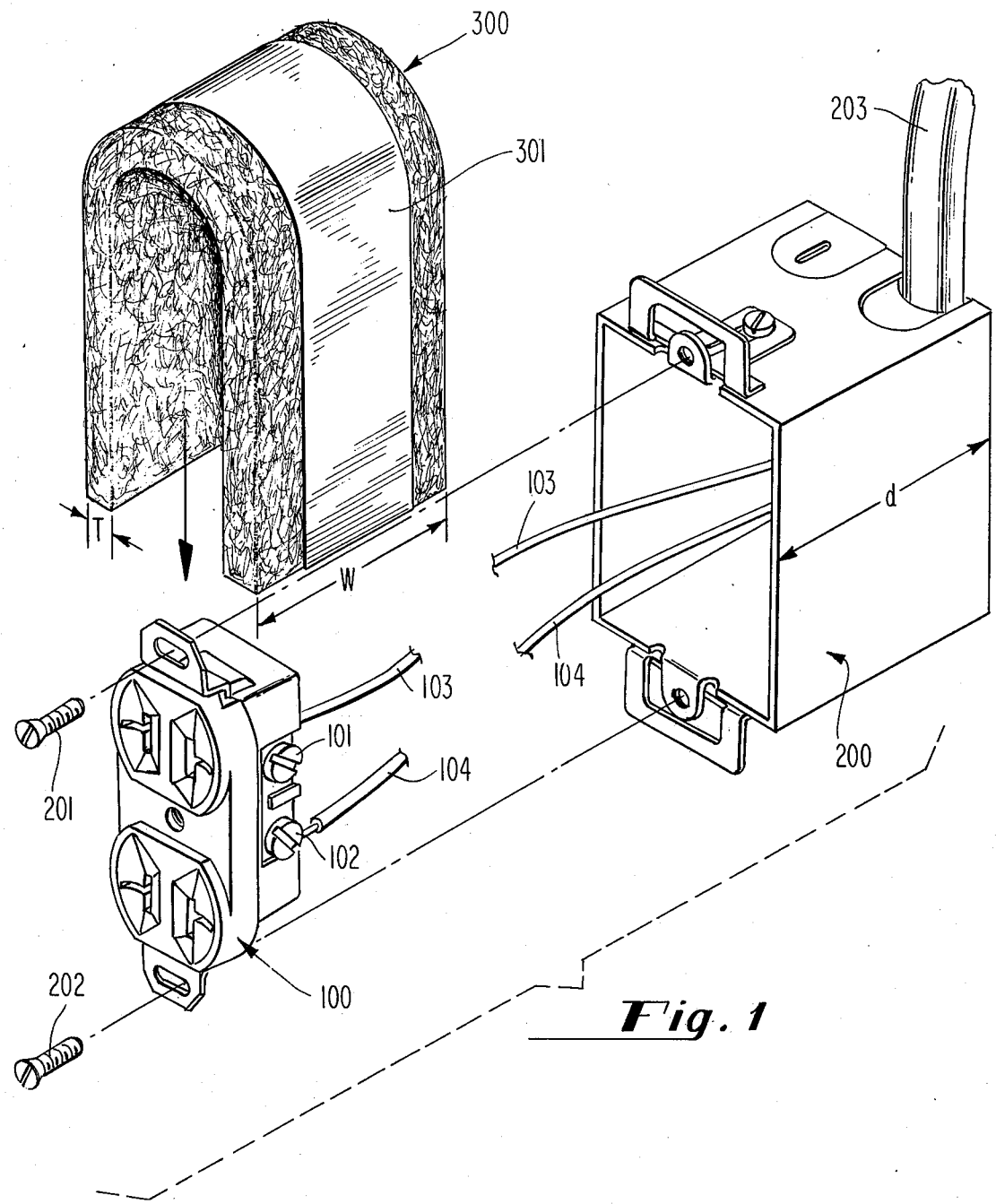
FIG. 1 is an exploded view of the electrical outlet box; receptacle; and insulation strip.

FIG. 1 is an exploded view of the electrical receptacle 100, electrical outlet box 200, and the insulation strip 300.

The outlet box 200, is normally permanently attached to the structure of the dwelling, not shown. An electrical connector 203 supplies input power to the outlet box 200. This electrical connector terminates in separate wire strands 103 and 104 which are connected to the electrical receptacle 100 as shown. A faceplate, not shown, frequently is used to provide a finished appearance to the outlet box.

Figure 2:
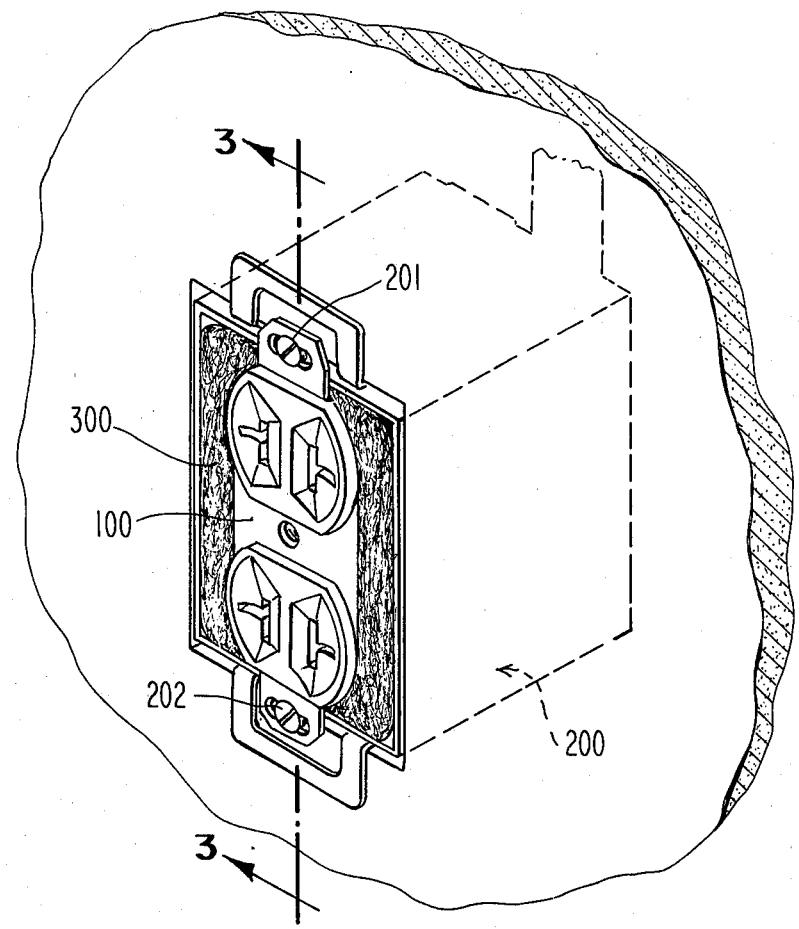
FIG. 2 is a perspective view of the outlet box assembly.
Figure 3:
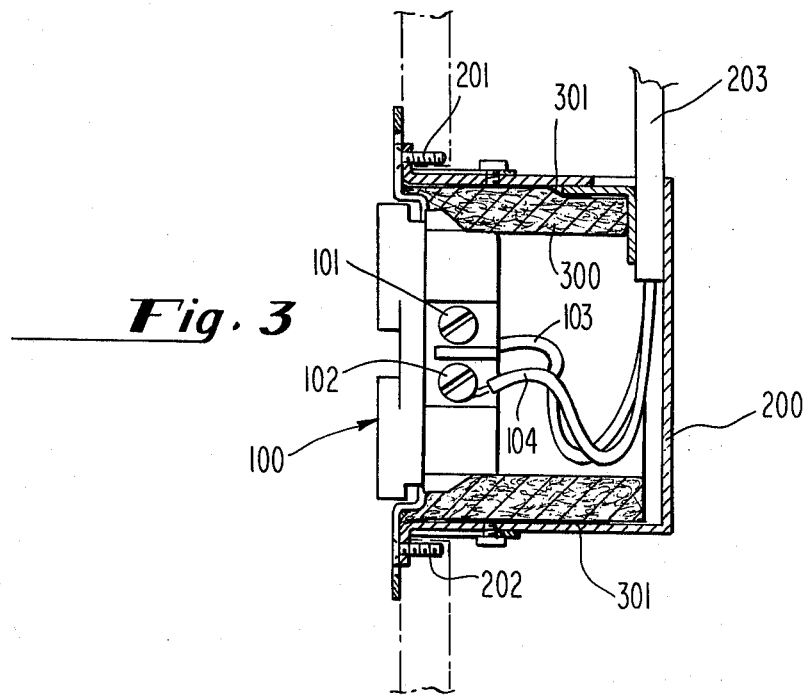
FIG. 3 is a cross-sectional view of the outlet box assembly taken along Line 2 of FIG. 2.

The purpose of the insulation strip 300 is to prevent the passage of air through the electrical outlet box 200 around the electrical receptacle 100 into the dwelling. This insulation strip 300 can be either retrofitted into existing installations quite easily, or installed at the time of the initial installation of the electrical system. The procedure for installing it is as follows: a strip of insulation 300 is selected which has a width W substantially equivalent to the depth O of the electrical outlet box 200. The thickness (T) of the strip 300 is selected such that the strip will expand to fill most of the unoccupied volume of the outlet box when installed in position as shown in FIG. 2 and FIG. 3. The electrical receptacle is separated from the outlet box by removing attachment screws 201 and 202. The receptacle is then withdrawn from the electrical outlet box with electrical connections 103 and 104 still in place. Insulation strip 300 is then wrapped around electrical receptacle 100 and the entire assembly pushed into the electrical outlet box as shown in FIGS. 2 and 3. The adhesively applied backing strip 301 facilitates easy insertion of the insulation into the electrical outlet box. It should be noted that it is possible to install the insulation strip on a receptacle that has previously been wired up and in use without disconnecting the electrical conductors attached to the electrical receptacle. Accordingly, the novel method of insulation disclosed in this application is particularly suited for use in presently wired systems.

As shown in FIG. 3 the insulation strip 300 sealingly engages the electrical receptacle 100 and the outlet box 200 in such a manner that no air can seep around the electrical receptacle and into the dwelling. While a faceplate may be used to provide a finished appearance to the overall assembly, it is not necessary to prevent the seepage of air into the dwelling.

Having fully described the novel features of my invention, what is claimed is:

1. A method of insulating an electrical outlet box assembly comprised of an electrical receptacle and an electrical outlet box to prevent the passage of air though the completed electrical outlet box assembly, said method comprising the steps of:
   a. cutting a strip of insulation to a length equal to the outer periphery of the body of the electrical receptacle;
   b. wrapping the insulation around the wired electrical receptacle;
   c. inserting the wrapped receptacle into the outlet box in such a manner that the insulation strip fills the unoccupied space in the outlet box.

2. The method in accordance with claim 1 wherein the insulating material is glass fiber, with an outer adhesively applied backing strip positioned between the insulating strip and the outlet box.

3. In combination, an electrical outlet box; an electrical receptacle affixed to the outlet box; a strip of insulating material sandwiched between the electrical outlet box and the electrical receptacle in such a manner that the insulating material prevents the passage of air through the completed assembly.

4. The combination in accordance with claim 3 further comprising a backing sheet adhesively applied to the insulation strip such that the backing strip is sealingly positioned between the outlet box and the insulation strip.

5. The combination in accordance with claim 4 wherein the insulating material is glass fiber.

* * * * *